United States Patent
Oh et al.

(10) Patent No.: US 11,339,250 B2
(45) Date of Patent: May 24, 2022

(54) POLYAMIDE-IMIDE FILM AND PROCESS FOR PREPARING THE SAME

(71) Applicant: SKC CO., LTD., Gyeonggi-do (KR)

(72) Inventors: Dae Seong Oh, Seoul (KR); Dawoo Jeong, Gyeonggi-do (KR); Sunhwan Kim, Incheon (KR); Jin Woo Lee, Gyeonggi-do (KR); Dong Jin Lim, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 316 days.

(21) Appl. No.: 16/452,803

(22) Filed: Jun. 26, 2019

(65) Prior Publication Data

US 2020/0407504 A1    Dec. 31, 2020

(51) Int. Cl.
| | |
|---|---|
| *C08G 73/10* | (2006.01) |
| *C08K 3/36* | (2006.01) |
| *C08L 79/08* | (2006.01) |
| *C08J 5/18* | (2006.01) |
| *C08G 73/14* | (2006.01) |

(52) U.S. Cl.
CPC ......... *C08G 73/1007* (2013.01); *C08G 73/14* (2013.01); *C08J 5/18* (2013.01); *C08K 3/36* (2013.01); *C08L 79/08* (2013.01); *C08K 2201/005* (2013.01); *C08L 2203/16* (2013.01)

(58) Field of Classification Search
CPC ........ C09D 179/08; C09D 7/67; C08G 73/14; C08K 3/36; C08L 79/08; C08L 2203/16; C08J 2379/08
See application file for complete search history.

(56) References Cited

U.S. PATENT DOCUMENTS

| | | | |
|---|---|---|---|
| 2010/0239749 A1* | 9/2010 | Yoshida | H05K 3/1283 427/97.3 |
| 2013/0083276 A1* | 4/2013 | Iwahashi | G02B 30/35 349/117 |
| 2015/0152232 A1* | 6/2015 | Ju | C08J 5/18 524/442 |
| 2016/0297995 A1* | 10/2016 | Oka | C09D 179/08 |

FOREIGN PATENT DOCUMENTS

| | | |
|---|---|---|
| KR | 10-2014-0002521 | 1/2014 |
| KR | 10-2017-0116513 | 10/2017 |

* cited by examiner

*Primary Examiner* — Gregory Listvoyb
(74) *Attorney, Agent, or Firm* — IP & T Group LLP

(57) ABSTRACT

Embodiments provide a polyamide-imide polymer film, which comprises a polyamide-imide polymer formed by polymerizing a diamine compound, a dianhydride compound, and a dicarbonyl compound; and silica particles, wherein the number of aggregates having an average diameter of 150 to 200 nm observed in a cross-section cut in the thickness direction of the polyamide-imide film is less than $0.5/\mu m^2$, and a process for preparing the same.

10 Claims, 3 Drawing Sheets

[Fig. 1]
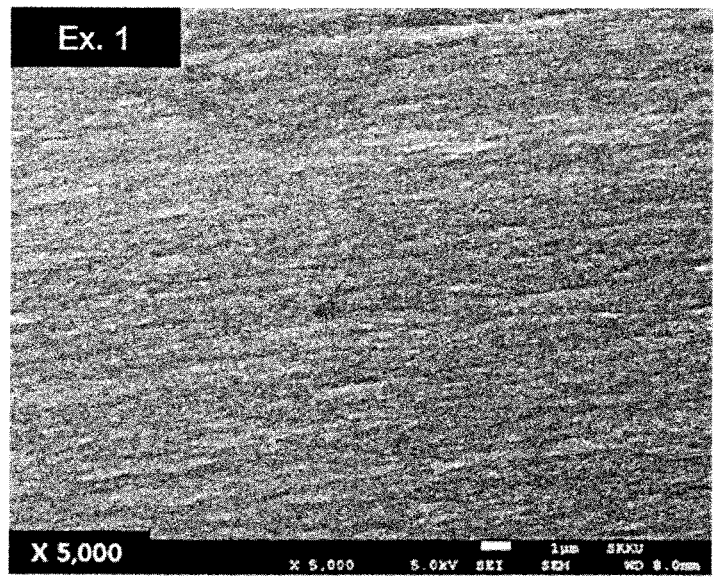
[Fig. 2]
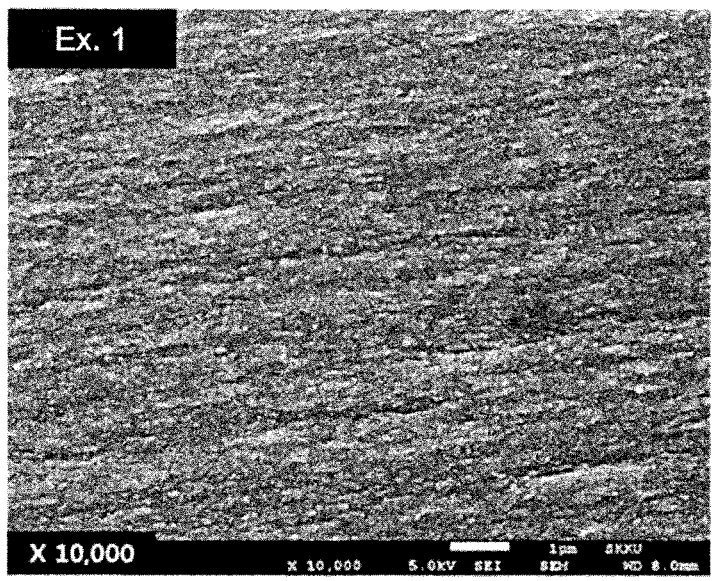

[Fig. 3]
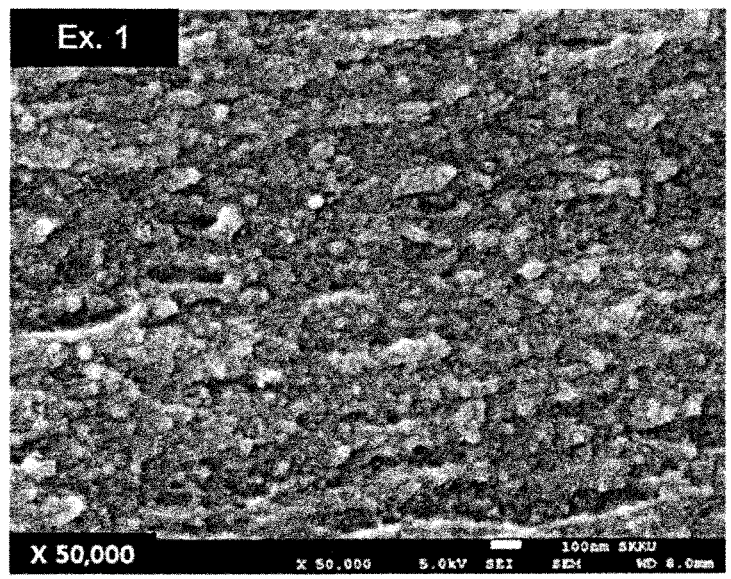
[Fig. 4]
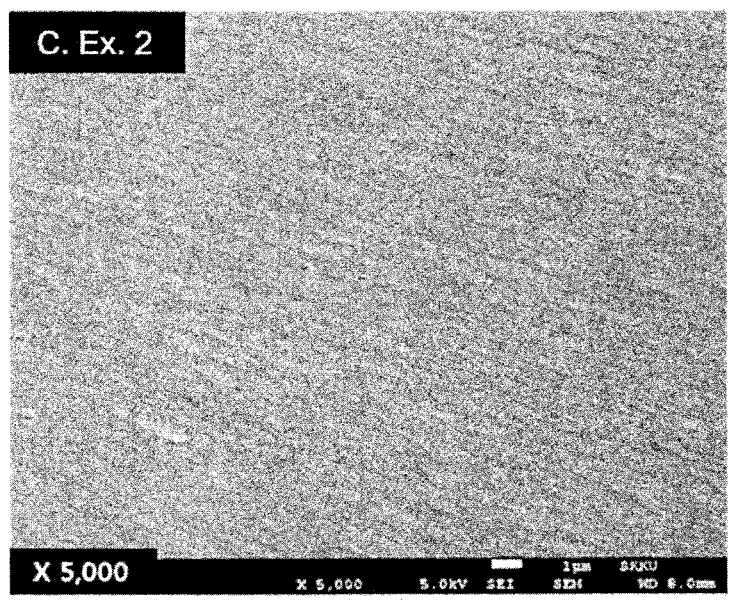

[Fig. 5]
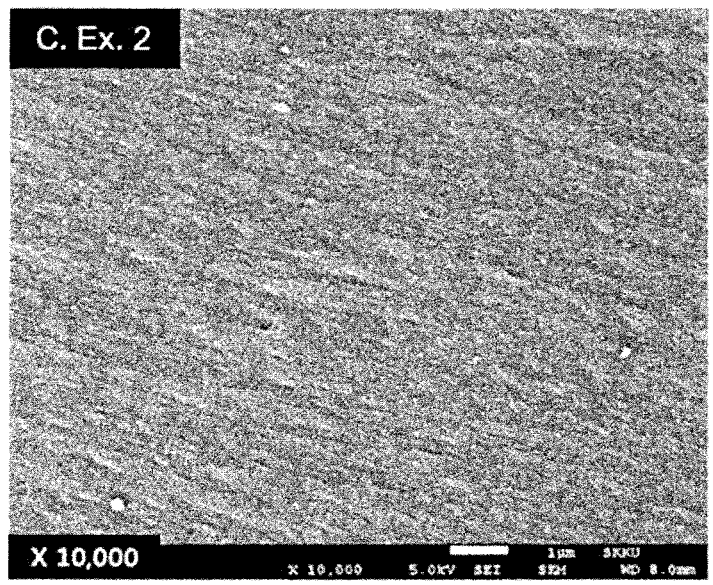
[Fig. 6]
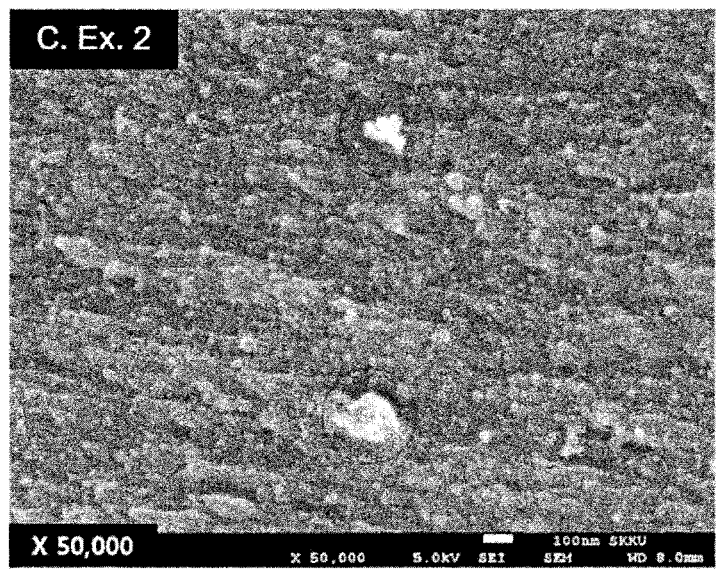

POLYAMIDE-IMIDE FILM AND PROCESS FOR PREPARING THE SAME

TECHNICAL FIELD

Embodiments relate to a polyamide-imide film, which is excellent in optical properties and has improved modulus, tensile strength, and elongation, and a process for preparing the same.

BACKGROUND ART

Since polyamide-imide (PAI) is excellent in resistance to friction, heat, and chemicals, it is employed in such applications as primary electrical insulation, coatings, adhesives, resins for extrusion, heat-resistant paintings, heat-resistant boards, heat-resistant adhesives, heat-resistant fibers, and heat-resistant films.

Polyamide-imide is used in various fields. For example, polyimide-imide is made in the form of a powder and used as a coating for a metal or a magnetic wire. It is mixed with other additives depending on the application thereof. In addition, polyamide-imide is used together with a fluoropolymer as a painter for decoration and corrosion prevention. It also plays a role of bonding a fluoropolymer to a metal substrate. In addition, polyimide-imide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyamide-imide has been developed in the form of a film, which is less expensive and has excellent optical, mechanical, and thermal characteristics.

DETAILED DESCRIPTION OF THE INVENTION

Technical Problem

An object of the embodiments is to provide a polyamide-imide film, which is excellent in optical properties and has improved modulus, tensile strength, and elongation, and a process for preparing the same.

Solution to the Problem

An embodiment provides a polyamide-imide polymer film, which comprises a polyamide-imide polymer formed by polymerizing a diamine compound, a dianhydride compound, and a dicarbonyl compound; and silica particles, wherein the number of aggregates having an average diameter of 150 to 200 mu observed in a cross-section cut in the thickness direction of the polyamide-imide film is less than $0.5/\mu m^2$.

In addition, another embodiment provides a process for preparing a polyamide-imide film, which comprises preparing a silica dispersion in which silica particles are dispersed; introducing the silica dispersion into an organic solvent; polymerizing a diamine compound, a dianhydride compound, and a dicarbonyl compound in the organic solvent to which the silica dispersion has been introduced to prepare a polyamide-imide polymer solution; transferring the polymer solution to a tank; extruding and casting the polymer solution in the tank and then drying the same to prepare a gel sheet; and thermally treating the gel sheet.

Advantageous Effects of the Invention

The polyamide-imide film according to the embodiment has improved mechanical properties in terms of modulus, tensile strength, elongation, and the like, and is also excellent in optical properties at the same time.

The process for preparing a polyamide-imide film according to the embodiment is capable of providing a polyamide-imide film, which has improved mechanical properties and is colorless, transparent, and excellent in optical properties.

BRIEF DESCRIPTION OF THE DRAWINGS

FIG. 1 is an SEM photograph (5,000 times) of a cross-section cut in the thickness direction of the film prepared in Example 1.

FIG. 2 is an SEM photograph (10,000 times) of a cross-section cut in the thickness direction of the film prepared in Example 1.

FIG. 3 is an SEM photograph (50,000 times) of a cross-section cut in the thickness direction of the film prepared in Example 1.

FIG. 4 is an SEM photograph (5,000 times) of a cross-section cut in the thickness direction of the film prepared in Comparative Example 2.

FIG. 5 is an SEM photograph (10,000 times) of a cross-section cut in the thickness direction of the film prepared in Comparative Example 2.

FIG. 6 is an SEM photograph (50,000 times) of a cross-section cut in the thickness direction of the film prepared in Comparative Example 2.

BEST MODE FOR CARRYING OUT THE INVENTION

Hereinafter, the present invention is described in detail. The embodiments may be modified into various forms as long as the gist of the invention is not altered.

In this specification, when a part is referred to as "comprising" an element, it is to be understood that the part may comprise other elements as well, unless otherwise indicated.

In addition, all numbers and expression related to the quantities of components, reaction conditions, and the like used herein are to be understood as being modified by the term "about," unless otherwise indicated.

In addition, the term "substituted" as used herein means to be substituted with at least one substituent group selected from the group consisting of deuterium, —F, —Cl, —Br, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

The terms first, second, and the like are used herein to describe various elements, and the elements should not be limited by the terms. The terms are used only for the purpose of distinguishing one element from another.

Polyamide-Imide Film

An embodiment provides a polyamide-imide film, which is excellent in optical properties and has improved mechanical properties in terms of modulus, tensile strength, elongation, and the like.

The polyamide-imide film according to an embodiment comprises a polyamide-imide polymer formed by polymerizing a diamine compound, a dianhydride compound, and a dicarbonyl compound; and silica particles.

The polyamide-imide polymer comprises an imide repeat unit derived from the polymerization of the diamine compound and the dianhydride compound and an amide repeat unit derived from the polymerization of the diamine compound and the dicarbonyl compound.

The polyamide-imide polymer may comprise a repeat unit represented by the following Formula A and a repeat unit represented by the following Formula B:

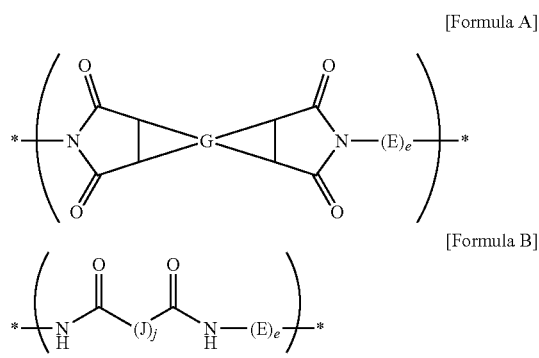

[Formula A]

[Formula B]

In the above Formulae A and B,

E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the 2 or more Es are the same as, or different from, each other, when j is 2 or more, then the 2 or more Js are the same as, or different from, each other, G is a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group is present alone, bonded to each other to form a condensed ring, or bonded by a bonding group selected from a substituted or unsubstituted alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

In the polyamide-imide polymer, the molar ratio of the imide repeat unit to the amide repeat unit may be 10:90 to 25:75, but it is not limited thereto. Specifically, the molar ratio of the imide repeat unit to the amide repeat unit may be 15:85 to 25:75 or 20:80 to 25:75, but it is not limited thereto.

If the molar ratio of the imide repeat unit to the amide repeat unit is within the above range, the polyamide-imide film is excellent in optical properties such as transmittance, haze, and the like and mechanical properties.

In the polyamide-imide polymer, the molar ratio of the repeat unit represented by the above Formula A to the repeat unit represented by the above Formula B may be 10:90 to 25:75, but it is not limited thereto. Specifically, the molar ratio of the repeat unit represented by the above Formula A to the repeat unit represented by the above Formula B may be 15:85 to 25:75 or 20:80 to 25:75, but it is not limited thereto.

The diamine compound is a compound that forms an imide bond with the dianhydride compound and forms an amide bond with the dicarbonyl compound, to thereby form a copolymer.

The diamine compound is a compound represented by the following Formula 1.

$$H_2N\text{-}(E)_e\text{-}NH_2 \qquad \text{[Formula 1]}$$

In the above Formula 1,

E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, Es may be the same as, or different from, each other.

(E)$_e$ in the above Formula 1 may be selected from the groups represented by the following Formulae 1-1a to 1-14a:

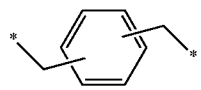

1-1a

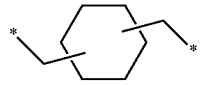

1-2a

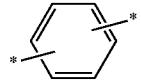

1-3a

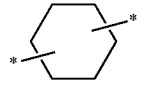

1-4a

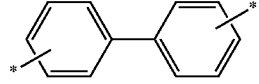

1-5a

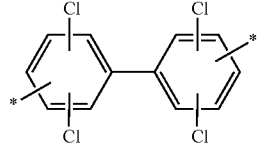

1-6a

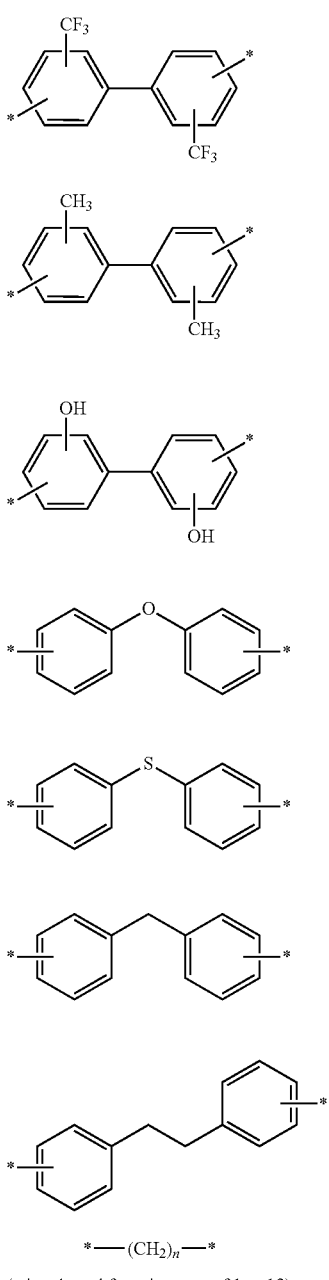

1-7a
1-8a
1-9a
1-10a
1-11a
1-12a
1-13a

*—(CH₂)ₙ—*

(n is selected from integers of 1 to 12)

1-14a

More specifically, (E)e in the above Formula 1 may be the group represented by the above Formula 1-6b.

The diamine compound may be an aromatic diamine compound.

In addition, the diamine compound may comprise a compound having a fluorine-containing substituent. Alternatively, the dianhydride compound may be composed of a compound having a fluorine-containing substituent. In such event, the fluorine-containing substituent may be a fluorinated hydrocarbon group and specifically may be a trifluoromethyl group. But it is not limited thereto.

For example, the diamine compound may comprise 2,2'-bis(trifluoromethyl)-4,4-diaminobiphenyl (TFDB) represented by the following formula, but it is not limited thereto.

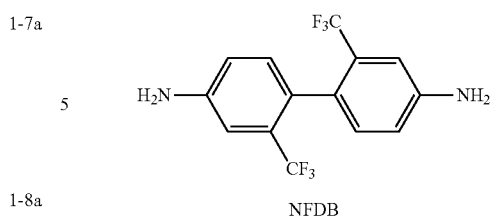

NFDB

The dianhydride compound is a compound that has a low birefringence value, so that it can contribute to enhancements in the optical properties such as transmittance of the polyamide-imide film.

The dianhydride compound is a compound represented by the following Formula 2.

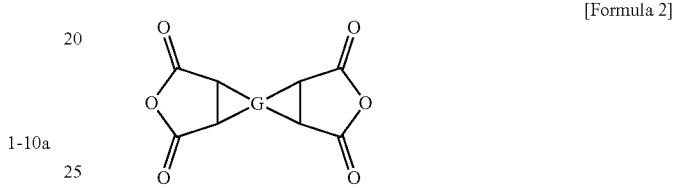

[Formula 2]

In the above Formula 2,

G is a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group is present alone, bonded to each other to form a condensed ring, or bonded by a bonding group selected from a substituted or unsubstituted alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)₂—, —Si(CH₃)₂—, —C(CH₃)₂—, and —C(CF₃)₂—.

G in the above Formula 2 may be selected from the groups represented by the following Formulae 2-1a to 2-9a, but it is not limited thereto.

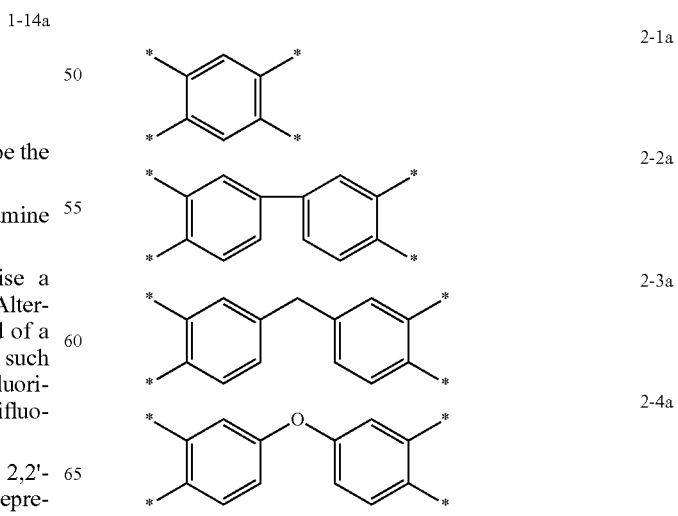

2-1a 2-2a 2-3a 2-4a

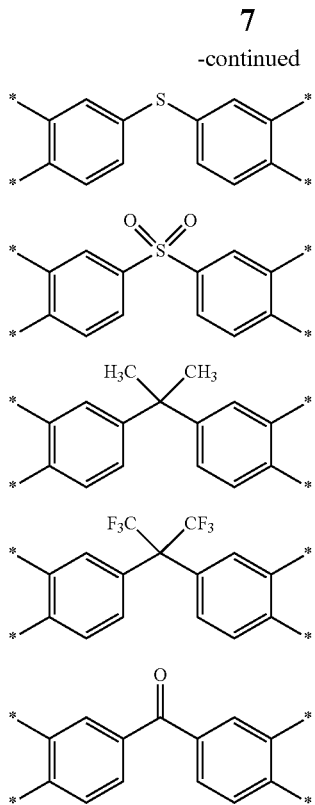

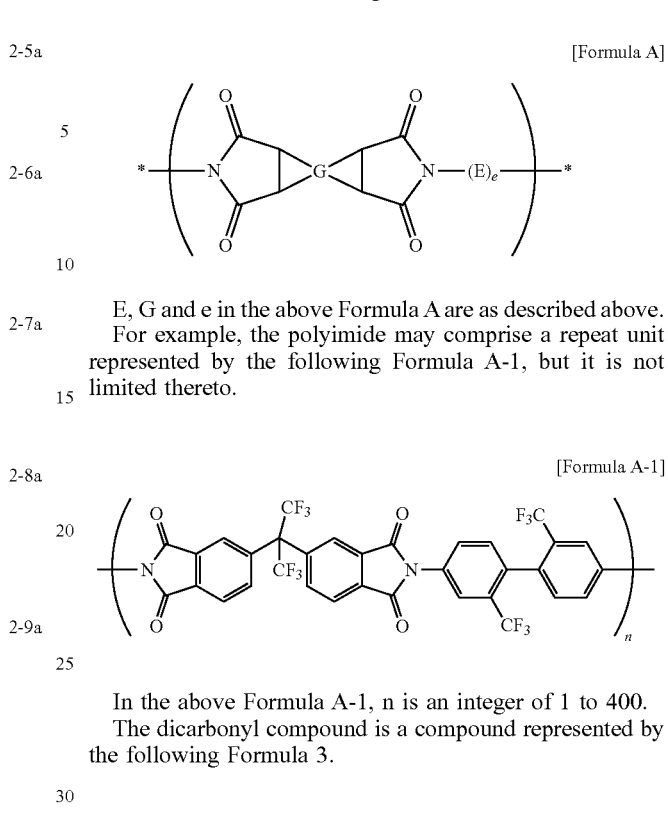

E, G and e in the above Formula A are as described above.

For example, the polyimide may comprise a repeat unit represented by the following Formula A-1, but it is not limited thereto.

[Formula A-1]

In the above Formula A-1, n is an integer of 1 to 400.

The dicarbonyl compound is a compound represented by the following Formula 3.

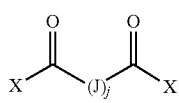

[Formula 3]

In the above Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or to unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, Js may be the same as, or different from, each other.

X is a halogen atom. Specifically, X may be F, Cl, Br, or the like. More specifically, X may be Cl, but it is not limited thereto.

(J)$_j$ in the above Formula 3 may be selected from the groups represented by the following Formulae 3-1a to 3-14a, but it is not limited thereto.

For example, G in the above Formula 2 may be the group represented by the above Formula 2-8a.

The dianhydride compound may be an aromatic dianhydride compound.

In addition, the dianhydride compound may comprise a compound having a fluorine-containing substituent. Alternatively, the dianhydride compound may be composed of a compound having a fluorine-containing substituent. In such event, the fluorine-containing substituent may be a fluorinated hydrocarbon group and specifically may be a trifluoromethyl group. But it is not limited thereto.

For example, the dianhydride compound may comprise 2,2'-bis-(3,4-dicarboxyphenyl) hexafluoropropane dianhydride (6-FDA) represented by the following formula, but it is not limited thereto.

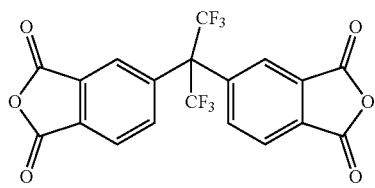

6-FDA

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

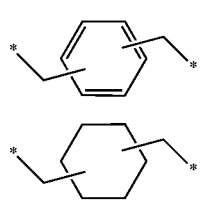

-continued

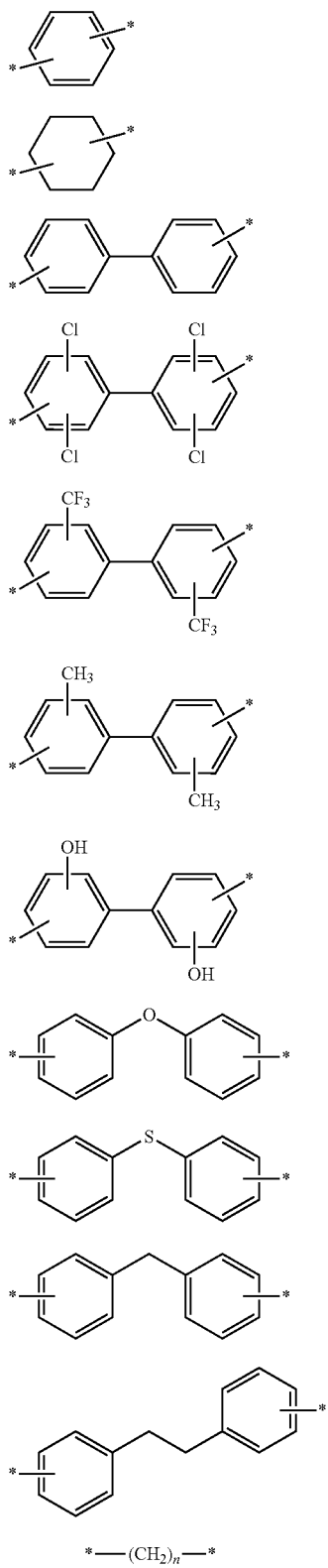

(n is selected from integers of 1 to 12)

Specifically, (J)$_j$ in the above Formula 3 may be selected from the groups represented by the following Formulae 3-1b to 3-8b, but it is not limited thereto.

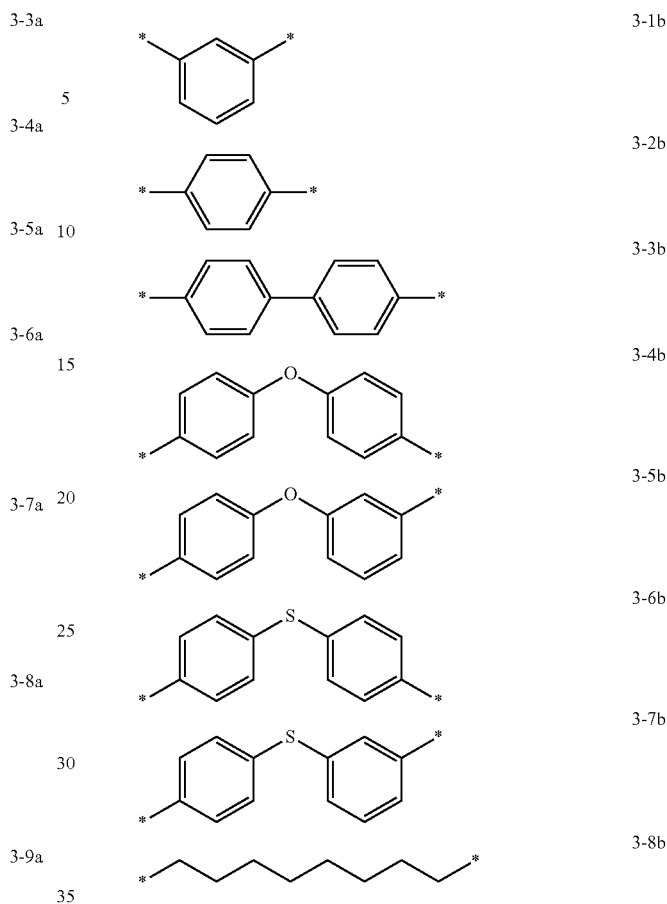

More specifically, (J)$_j$ in the above Formula 3 may be the group represented by the above Formula 3-2b or 3-3b.

The dicarbonyl compound may comprise at least two dicarbonyl compounds different from each other. In addition, the dicarbonyl compound may be composed of two dicarbonyl compounds different from each other.

The dicarbonyl compound may be an aromatic dicarbonyl compound

For example, the dicarbonyl compound may comprise a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of the polyamide-imide film thus produced.

The dicarbonyl compound may comprise terephthaloyl chloride (TPC), 1,1'-biphenyl-4,4'-dicarbonyl dichloride (BPDC), as represented by the following formulae, or a combination thereof. But it is not limited thereto.

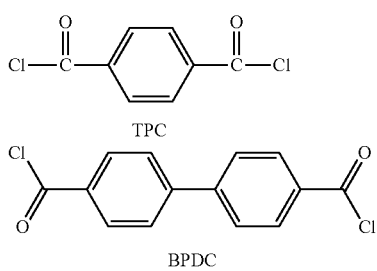

TPC

BPDC

For example, the first dicarbonyl compound may comprise BPDC, and the second dicarbonyl compound may comprise TPC, but they are not limited thereto.

Specifically, if BPDC is used as the first dicarbonyl compound and TPC is used as the second dicarbonyl compound in a proper combination, the polyamide-imide film thus produced may have high oxidation resistance.

The diamine compound and the dicarbonyl compound may be polymerized to form a repeat unit represented by the following Formula B.

[Formula B]

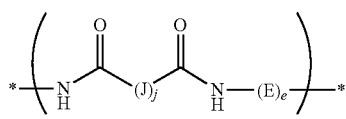

E, J, e, and j in the above Formula B are as described above.

For example, the diamine compound and the dicarbonyl compound may be polymerized to form amide repeat units represented by the following Formulae B-1 and B-2.

[Formula B-1]

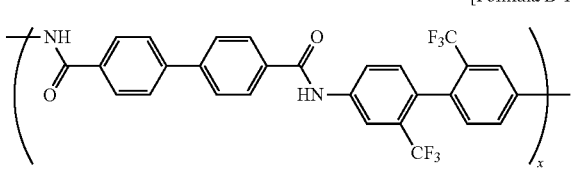

In the above Formula B-1, x is an integer of 1 to 400.

[Formula B-2]

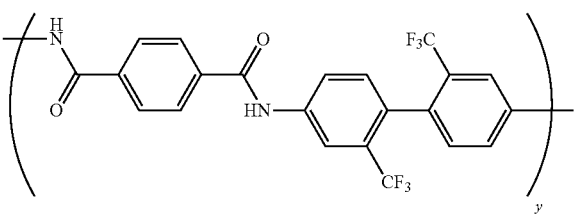

In the above Formula B-2, y is an integer of 1 to 400.

The polyamide-imide film according to another embodiment may comprise a polyamide-imide polymer formed by polymerizing an aromatic diamine compound, an aromatic dianhydride compound, and a dicarbonyl compound, wherein the aromatic diamine compound may comprise one kind of aromatic diamine compound, the aromatic dianhydride compound may comprise one kind of aromatic dianhydride compound, and the dicarbonyl compound may comprise two kinds of dicarbonyl compound.

Alternatively, the aromatic diamine compound may be composed of one kind of diamine compound, the aromatic dianhydride compound may be composed of one kind of aromatic dianhydride compound, and the dicarbonyl compound may be composed of two kinds of dicarbonyl compound.

For example, the diamine compound may comprise 2,2'-bis(trifluoromethyl)-4,4'-diaminobiphenyl (TFDB), the dianhydride compound may comprise 2,2'-bis-(3,4-dicarboxyphenyl) hexafluoropropane dianhydride (6-FDA), and the dicarbonyl compound may comprise terephthaloyl chloride (TPC), 1,1'-biphenyl-4,4'-dicarbonyl dichloride (BPDC), or a combination thereof. But they are not limited thereto.

Alternatively, the diamine compound may be composed of 2,2'-bis(trifluoromethyl)-4,4'-diaminobiphenyl (TFDB), the dianhydride compound may be composed of 2,2'-bis-(3,4-dicarboxyphenyl) hexafluoropropane dianhydride (6-FDA), and the dicarbonyl compound may be composed of terephthaloyl chloride (TPC) and 1,1'-biphenyl-4,4'-dicarbonyl dichloride (BPDC). But they are not limited thereto.

An embodiment is characterized in that it is capable of providing a polyamide-imide film whose optical characteristics, mechanical properties, and flexibility are improved in a well-balanced manner without a complicated process by properly controlling the content of the imide repeat unit and that of the amide repeat unit.

In addition, it is possible to provide a polyamide-imide film whose optical characteristics, mechanical properties, and flexibility are improved in a well-balanced manner without such steps as precipitation, filtration, drying, and redissolution as adopted in the prior art.

The content of the imide repeat unit and that of the amide repeat unit may be controlled by the amounts of the aromatic dianhydride and the dicarbonyl compound, respectively.

The polyamide-imide film comprises a polyamide-imide polymer; and silica particles.

The average particle size of primary particles of the silica particles is 10 to 40 nm. Specifically, the average particle size of primary particles of the silica particles may be 15 to 40 nm, 15 to 35 nm, 20 to 40 nm, 20 to 35 nm, or 25 to 35 nm, but it is not limited thereto.

The average particle size of secondary particles of the silica particles is 30 to 80 nm. Specifically, the average particle size of secondary particles of the silica particles may be 30 to 75 nm, 30 to 70 mm, 35 to 75 nm, 40 to 70 nm, 40 to 65 nm, 45 to 65 nm, or 40 to 60 nm, but it is not limited thereto.

The primary particle refers to a particle, which is the minimum unit in which the silica particles are aggregated, and the secondary particle refers to a particle in which a plurality of primary particles aggregate and behave as one particle.

The ratio of the average particle diameter of the secondary particles to the average particle diameter of the primary particles of the silica particles is 1.2 to 3.0. Specifically, the ratio of the average particle diameter of the secondary particles to the average particle diameter of the primary particles of the silica particles may be 1.2 to 2.5, 1.2 to 2.2, 1.2 to 2.0, or 1.4 to 2.0, but it is not limited thereto.

If the ratio of the average particle diameter of the secondary particles to the average particle diameter of the primary particles of the silica particles is within the above range, the dispersibility is more secured, which produces the effect that they are evenly distributed in a substrate.

The content of the silica particles is 50 to 600 ppm based on the total weight of the polyamide-imide polymer. Specifically, the content of the silica particles may be 50 to 500 ppm, 50 to 450 ppm, 100 to 450 ppm, 150 to 450 ppm, 200 to 400 ppm, or 230 to 350 ppm, based on the total weight of the polyamide-imide polymer, but it is not limited thereto.

The number of aggregates having an average diameter of 150 to 200 nm observed in a cross-section cut in the thickness direction of the polyamide-imide film according to an embodiment is less than $0.5/\mu m^2$. Specifically, the number of aggregates having an average diameter of 150 to 200 nm observed in a cross-section cut in the thickness direction of the polyamide-imide film according to an embodiment may be 0 to $0.4/\mu m^2$, 0 to $0.3/\mu m^2$, 0 to $0.2/\mu m^2$, 0 to $0.15/\mu m^2$, 0 to $0.1/\mu m^2$, or 0 to $0.05/\mu m^2$, but it is not limited thereto.

The cross-section cut in the thickness direction of the film may be a cross-section cut perpendicularly in the thickness direction of the film.

The aggregate is an agglomerate that contains silica particles, which is formed when the silica particles are not uniformly distributed.

If the number of aggregates having an average diameter of 150 to 200 nm observed in a cross-section cut in the thickness direction of the polyamide-imide film is $0.5/\mu m^2$ or more, the aggregates that contain the silica particles act as a foreign material, which may deteriorate the mechanical properties and optical characteristics.

The average diameter refers to the average diameter of an equivalent circle when the aggregate is not in a true circle shape. The diameter of an equivalent circle refers to the diameter of a circle when the shape of the observed aggregate is assumed to be a circle having the same projection area as the projected area of the aggregate.

The polyamide-imide film satisfies the following Relationship 1:

$$4 \leq X/Y \leq 12 \quad \text{[Relationship 1]}$$

wherein X is the maximum diameter (mm) of perforation including a crack when the film is perforated at a rate of 10 mm/min using a 2.5 mm spherical tip in a UTM compression mode; and Y is the modulus (GPa) of the film.

The polyamide-imide film has a maximum diameter (X) of perforation of 60 mm or less based on a thickness of 50 µm. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The polyamide-imide film has a compressive strength of 0.4 kgf/µm or more based on a thickness of 50 µm. Specifically, the compressive strength may be 0.45 kgf/µm or more, or 0.46 kgf/µm or more, but it is not limited thereto.

The polyamide-imide film has a surface hardness of FIB or higher. Specifically, the surface hardness may be H or more, or 2H or more, but it is not limited thereto.

The polyamide-imide film has a light transmittance measured at 550 nm of 85% or more based on a thickness of 50 µm. Specifically, the light transmittance may be 86% or more, 87% or more or 88% or more, or 88.5% or more or 88.8%, but it is not limited thereto.

The polyamide-imide film has a light transmittance measured at 388 nm of 60% or more based on a thickness of 50 µm. Specifically, the light transmittance measured at 388 nm based on a thickness of 50 µm may be 62% or more, 63% or more, 63.3% or more, or 63.4% or more, but it is not limited thereto.

The polyamide-imide film has a haze of 2% or less based on a thickness of 50 µm. Specifically, the haze may be 1.8% or less, 1.5% or less, 1.2% or less, 1.0% or less, 0.9% or less, 0.8% or less, or 0.7% or less, but it is not limited thereto.

The polyamide-imide film has a yellow index of 5 or less based on a thickness of 50 µm. Specifically, the yellow index may be 3 or less, 2.8 or less, 2.7 or less, 2.5 or less, or 2.3 or less, but it is not limited thereto.

The polyamide-imide film has a modulus of 5.0 GPa or more based on a thickness of 50 µm. Specifically, the modulus may be 5.5 GPa or more, 5.8 GPa or more, 6.0 GPa or more, 6.2 GPa or more, or 6.4 GPa or more, but it is not limited thereto.

The polyamide-imide film has a tensile strength of 15 $kgf/mm^2$ or more lased on a thickness of 50 µm. Specifically, the tensile strength may be 18 $kgf/mm^2$ or more, 20 $kgf/mm^2$ or more, 21 $kgf/mm^2$ or more, 22 $kgf/mm^2$ or more, 23 $kgf/mm^2$ or more, or 24 $kgf/mm^2$ or more, but it is not limited thereto.

The polyamide-imide film has an elongation of 15% or more based on a thickness of 50 µm. Specifically; the elongation may be 16% or more, 18% or more, 20% or more, or 21% or more, but it is not limited thereto.

The various characteristics of the polyamide-imide film as described above may be combined.

For example, the polyamide-imide film may have a modulus of 5.0 GPa or more, an elongation of 15% or more, a tensile strength of 15 $kgf/mm^2$ or more, and a haze of 2% or less, based on a thickness of 50 µm, but it is not limited thereto.

Process for Preparing a Polyamide-Imide Film

An embodiment provides a process for preparing a polyamide-imide film, which is excellent in optical properties and, in particular, has improved modulus, tensile strength, and elongation.

The process for preparing a polyimide-imide film according to an embodiment comprises preparing a silica dispersion in which silica particles are dispersed; introducing the silica dispersion into an organic solvent; polymerizing a diamine compound, a dianhydride compound, and a dicarbonyl compound in the organic solvent to which the silica dispersion has been introduced to prepare a polyamide-imide polymer solution; transferring the polymer solution to a tank; extruding and casting the polymer solution in the tank and then drying the same to prepare a gel sheet; and thermally treating the gel sheet. In such event, the viscosity of the polymer solution may be 100,000 cps to 300,000 cps.

In such event, the details of the diamine compound, the dianhydride compound, the dicarbonyl compound, the polyamide-imide polymer, and the silica particles are as described above.

In the process for preparing a polyamide-imide film according to an embodiment, first, a silica dispersion in which silica particles are dispersed is prepared.

In the above step of preparing a silica dispersion in which silica particles are dispersed, the silica dispersion is prepared by introducing the silica particles into an organic solvent and then subjecting them to ultrasonic treatment. In such event, the ultrasonic treatment is carried out by ultrasonic treatment in an ultrasonic bath for 5 to 30 minutes.

The content of silica particles in the silica dispersion is 0.2 to 5% by weight. Specifically, the content of silica particles in the silica dispersion may be 0.2 to 3% by weight, 0.5 to 2% by weight, 0.5 to 1.5% by weight, or 1% by weight, but it is not limited thereto.

Subsequently, the silica dispersion thus prepared is introduced into an organic solvent. In such event, the silica dispersion is introduced such that the content of silica particles is 50 to 600 ppm based on the total weight of the polyimide-imide polymer. Specifically, the content of silica particles may be 50 to 500 ppm, 50 to 450 ppm, 100 to 450 ppm, 150 to 450 ppm, 200 to 400 ppm, or 230 to 350 ppm, based on the total weight of the polyamide-imide polymer, but it is not limited thereto.

Once the prepared silica dispersion has been introduced into an organic solvent, it is stirred for about 30 minutes to about 2 hours so that the silica particles can be uniformly dispersed throughout the organic solvent.

If the silica dispersion is introduced before the polymerization reaction as described above, the silica particles can participate in the polymerization reaction such as the step of obtaining a polyamic acid solution to form hydrogen bonds, which produces the effect that they are evenly distributed in a substrate, thereby enhancing the dispersibility.

Subsequently, a diamine compound, a dianhydride compound, and a dicarbonyl compound are polymerized in the organic solvent to which the silica dispersion has been introduced to prepare a polyamide-imide polymer solution.

In addition, the dicarbonyl compound may comprise a first dicarbonyl compound and a second dicarbonyl compound. In such event, the above step of preparing a polyamide-imide polymer solution may comprise polymerizing a diamine compound, a dianhydride compound, a first dicarbonyl compound, and a second dicarbonyl compound in an organic solvent to prepare a first polymer solution; and further adding the second dicarbonyl compound to the first polymer solution to prepare a second polymer solution, but it is not limited thereto.

The polymer solution comprises a polyamide-imide polymer and an organic solvent.

The organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. But it is not limited thereto. Specifically, the organic solvent may be dimethylacetamide (DMAc), but it is not limited thereto.

The organic solvent used to prepare the polyamide-imide polymer solution and the organic solvent used to prepare the silica dispersion may be the same or different.

The above step of preparing the first polymer solution may be carried out by simultaneously or sequentially polymerizing the diamine compound, the dianhydride compound, the first dicarbonyl compound, and the second dicarbonyl compound.

Specifically, according to an embodiment, the above step of preparing the first polymer solution may be carried out by simultaneously polymerizing the diamine compound, the dianhydride compound, the first dicarbonyl compound, and the second dicarbonyl compound.

According to another embodiment, the above step of preparing the first polymer solution may comprise polymerizing the diamine compound and the dianhydride compound to prepare a polyamic acid solution; and adding the first dicarbonyl compound and the second dicarbonyl compound to the polyamic acid solution and polymerizing them. The polyamic acid solution is a solution that comprises a polyamic acid.

According to still another embodiment, the above step of preparing the first polymer solution may comprise polymerizing the diamine compound and the dianhydride compound to prepare a polyamic acid solution; subjecting the polyamic acid solution to dehydration to prepare a polyimide solution; and adding the first dicarbonyl compound and the second dicarbonyl compound to the polyimide solution and polymerizing them. The polyimide solution is a solution that comprises a polymer having an imide repeat unit.

According to another embodiment, the above step of preparing the first polymer solution may comprise polymerizing the diamine compound, the first dicarbonyl compound, and the second dicarbonyl compound to prepare a polyamide solution; and adding the dianhydride compound to the polyamide solution and polymerizing them. The amide polymer solution is a solution that comprises a polymer having amide repeat units.

The copolymer comprised in the first polymer solution may comprise an imide repeat unit derived from the polymerization of the diamine compound and the 115 dianhydride compound and an amide repeat unit derived from the polymerization of the diamine compound and the dicarbonyl compound.

A catalyst may be further added in the step of obtaining the first polymer solution, in the step of obtaining the second polymer solution, or after the preparation of the polyamide-imide polymer solution.

Examples of the catalyst include, but are not limited to, beta picoline, acetic anhydride, and the like.

The further addition of the catalyst may expedite the reaction rate and produce the effect of improving the bonding force between the repeat unit structures or that within the repeat unit structures.

In addition, the viscosity of the polymer solution may be appropriately adjusted in the steps of adding the catalyst, drying and redissolving the polymer solution, or the step of adding the solvent for the extrusion step.

In another embodiment, the step of obtaining the first polymer solution comprises introducing the dianhydride compound, the first dicarbonyl compound, and the second dicarbonyl compound into an excess of the diamine compound.

Specifically, the dianhydride compound may be employed in an amount of 10 to 25% by mole based on the total moles of the dianhydride compound, the first dicarbonyl compound, and the second dicarbonyl compound, but it is not limited thereto.

If the content of the dianhydride compound is within the above range, the polyamide-imide film is excellent in such mechanical properties as modulus, tensile strength, elongation, surface hardness, and the like.

In addition, the first dicarbonyl compound and the second dicarbonyl compound may be employed in an amount of 75% by mole to 90% by mole based on the total moles of the dianhydride compound, the first dicarbonyl compound, and the second dicarbonyl compound, but it is not limited thereto.

If the content of the dicarbonyl compounds is within the above range, the polyamide-imide film is excellent in such optical properties as light transmittance, haze, and the like.

In the step of obtaining the first polymer solution in another embodiment, the first dicarbonyl compound may be employed in an amount of 50% by mole to 70% by mole based on the total moles of the first dicarbonyl compound and the second dicarbonyl compound, but it is not limited thereto.

The first dicarbonyl compound may be 1,1'-biphenyl-4,4'-dicarbonyl dichloride (BPDC), and the second dicarbonyl compound may be terephthaloyl chloride (TPC).

If the content of the first dicarbonyl compound is less than 50% by mole, the modulus of the polyamide-imide film may be deteriorated. If the content of the first dicarbonyl compound exceeds 70% by mole, such optical properties as haze and the like may be deteriorated.

Preferably; in the step of obtaining the first polymer solution, (i) an excessive amount of the diamine compound at least in the same molar amount as that of the other reactants, (ii) 10% by mole to 25% by mole of the dianhydride compound based on the total moles of the dianhydride compound, the first dicarbonyl compound, and the second dicarbonyl compound, and (iii) 75% by mole to 90% by mole of the first dicarbonyl compound and the second dicarbonyl compound based on the total moles of the dianhydride compound, the first dicarbonyl compound, and the second dicarbonyl compound may be employed.

Specifically, 50% by mole to 70% by mole of the first dicarbonyl compound (e.g., 1,1'-biphenyl-4,4'-dicarbonyl dichloride; BPDC) and 30% by mole to 50% by mole of the second dicarbonyl compound (e.g., terephthaloyl chloride; TPC) based on the total moles of the first dicarbonyl compound and the second dicarbonyl compound may be employed.

It is possible to obtain a polyamide-imide film whose optical characteristics, mechanical properties, and flexibility are improved in a well-balanced manner without such steps as precipitation, filtration, drying, and redissolution as adopted in the prior 115 art by way of properly controlling the respective contents of the imide repeat unit and the amide repeat unit in the step of obtaining the first polymer solution.

After the step of obtaining the first polymer solution, the second polymer solution having a viscosity of 100,000 to 300,000 cps may be obtained by further adding the second dicarbonyl compound to the first polymer solution. Specifically, the second polymer solution having a viscosity of 100,000 to 250,000 cps, 150,000 to 250,000 cps, or 150,000 to 300,000 cps may be obtained.

If the viscosity of the second polymer solution is within the above range, a polyamide-imide film can be effectively produced in the extrusion and casting steps. In addition, the polyamide-imide film thus produced may have mechanical properties in terms of an improved modulus and the like.

The weight ratio of the second dicarbonyl compound added in the step of obtaining the first polymer solution to the second dicarbonyl compound added in the step of obtaining the second polymer solution may be 90:10 to 99:1, but it is not limited thereto.

In addition, the second dicarbonyl compound added in the step of obtaining the second polymer solution may be in the form of a solution in which the second dicarbonyl compound is dissolved in an organic solvent at a concentration of 5 to 20% by weight, but it is not limited thereto.

This is advantageous in that the desired viscosity can be accurately achieved.

According to an embodiment, the content of solids contained in the second polymer solution may be 10% by weight to 20% by weight. Specifically, the content of solids contained in the second polymer solution may be 12% by weight to 18% by weight, but it is not limited thereto.

If the content of solids contained in the second polymer solution is within the above range, a polyamide-imide film can be effectively produced in the extrusion and casting steps. In addition, the polyamide-imide film thus produced may have mechanical properties in terms of an improved modulus and the like and optical properties in terms of a low yellow index and the like.

After the second polymer solution is obtained, the pH of the second polymer solution may be adjusted by adding a neutralizing agent.

Examples of the neutralizing agent include, but are not limited to, amine-based neutralizing agents such as alkoxyamine, alkylamine, alkanolamine, and the like, but it is not limited thereto.

The neutralizing agent may be employed in an amount of about 0.1% by mole to about 10% by mole based on the total number of moles of monomers in the polyamide-imide polymer solution.

The pH of the second polymer solution adjusted by the neutralizing agent may be about 4 to about 7. Specifically, the adjusted pH of the second polymer solution may be about 4.5 to about 7.

If the pH of the second polymer solution is within the above-described range, it is possible to prevent damage to the equipment in the extrusion and casting steps to be described below. In addition, the polyamide-imide film thus produced may have an effect in that its optical properties are improved by, for example, lowering the yellow index or preventing increases in the yellow index and that its mechanical properties are improved in terms of modulus and the like.

After the step of preparing the polymer solution, the polymer solution is transferred to a tank.

In such event, it is preferable that the internal temperature of the tank is −20° C. to 20° C. This is to prevent degradation of the charged polymer solution and to lower the moisture content therein.

After the step of transferring the polymer solution to the tank, the process may further comprise vacuum degassing by depressurizing the internal pressure of the tank 0.1 to 0.7 bar for 30 minutes to 3 hours.

Alternatively, after the step of transferring the prepared polymer solution into the tank, the process may further comprise purging the tank with nitrogen gas at 1 to 2 atmospheres.

The step of vacuum degassing and the step of purging the tank with nitrogen gas are performed in a separate process, respectively.

For example, after the step of transferring the polymer solution to the tank, the process may further comprise vacuum degassing by depressurizing the internal pressure of the tank to 0.1 to 0.7 bar for 30 minutes to 3 hours and purging the tank with nitrogen gas at 1 to 2 atmospheres.

For example, the step of vacuum degassing may be carried out, followed by the step of purging the tank with nitrogen gas, but it is not limited thereto.

The step of vacuum degassing and/or the step of purging the tank with nitrogen may improve the physical properties of the surface of the polyamide-imide film thus produced.

Next, the polymer solution in the tank is extruded and cast, and it is then dried to prepare a gel sheet.

In the above extrusion and casting steps, the above-mentioned organic solvent may be used.

The polymer solution is extruded and cast onto a casting body such as a casting roll, a casting belt, and the like. In such event, the casting may be carried out on the casting body at a rate of about 0.5 m/min to about 15 m/min and in a thickness of 200 to 700 μm. If the rate of extrusion and casting is within the above range, the polyamide-imide film prepared by the process according to the embodiment may have improved optical characteristics and mechanical characteristics.

That is, if the polymer solution has a viscosity within the above range, the extrusion and casting at the extrusion rate as described above may be advantageous in having improved optical characteristics and mechanical characteristics.

After the polymer solution is cast onto a casting body, the solvent contained in the polymer solution is removed by a drying step to thereby form a gel sheet on the casting body.

The drying step may be carried out at a temperature of about 60° C. to about 150° C. for about 5 minutes to about 60 minutes.

Next, the gel sheet is subjected to thermal treatment to prepare a polyamide-imide film according to the embodiment.

The thermal treatment may be carried out in a temperature range of 80 to 500° C. at a temperature elevation rate of 2° C./min to 80° C./min for 5 to 40 minutes or 5 to 30 minutes.

The maximum temperature in the thermal treatment may be 300 to 500° C. or 320 to 500° C. In more detail, the maximum temperature in the thermal treatment may be 350 to 500° C., 380 to 500° C., 400 to 500° C., 410 to 480° C., 410 to 470° C., or 410 to 450° C., but it is not limited thereto.

After the thermal treatment step, a step of lowering the temperature of the thermally treated sheet may be further carried out. The step of lowering the temperature may comprise a first temperature lowering step of reducing the temperature at a rate of 100° C./min to 1,000° C./min and a second temperature lowering step of reducing the temperature at a rate of 40° C./min to 400° C./min.

Specifically, the second temperature lowering step is performed after the first temperature lowering step.

In addition, the temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering steps.

Since the polyamide-imide polymer has high oxidation resistance, it is hardly affected by oxygen contained in the atmosphere during the thermal treatment step. Thus, the polyamide-imide film according to the embodiment may have improved mechanical characteristics and optical characteristics.

In addition, nitrogen gas purging is carried out when a polyimide film is formed in the conventional process in order to prevent yellowing of the film and to secure transparency of the film. According to the embodiment, however, a polyamide-imide film having excellent optical characteristics can be produced without such nitrogen gas purging.

The details of the polyamide-imide film prepared by the process for producing a polyimide-imide film is referenced to those of the polyamide-imide film as described above.

Embodiments for Carrying Out the Invention

Hereinafter, the present invention will be described in detail by referring to examples. But the following examples are intended to illustrate the present invention, and the scope of the present invention is not limited thereto only.

Preparation Example 1: Preparation of a Silica Dispersion

Silica particles (average particle diameter of primary particles: about 30 nm, average particle diameter of secondary particles: about 50 nm) were introduced to dimethylacetamide (DMAc) as an organic solvent and subjected to ultrasonic treatment in an ultrasonic water bath for 10 minutes to prepare a silica dispersion at a concentration of 1% by weight.

Example 1

A 1-liter glass reactor equipped with a temperature-controllable double jacket was charged with 710.8 g of dimethyl acetamide (DMAc) as an organic solvent at 10° C. under a nitrogen atmosphere. Then, 2.75 g of the silica dispersion prepared in Preparation Example 1 (300 ppm based on the total weight of the polyamide-imide polymer) was added to the glass reactor and stirred for 1 hour.

64 g (0.2 mole) of 2,2'-bis(trifluoromethyl)-4,4'-diaminobiphenyl (TFDB) as an aromatic diamine was gradually added to the glass reactor to which the silica dispersion had been added and dissolved.

Subsequently, while 17.76 g (0.04 mole) of 2,2'-bis(3,4-dicarboxyphenyl) hexafluoropropane dianhydride (6-FDA) as an aromatic dianhydride was gradually added thereto, the mixture was stirred for 1 hour.

Then, 27.9 g (0.1 mole) of 1,1'-biphenyl-4,4'-dicarbonyl-dichloride (BPDC) as a first dicarbonyl compound was added, followed by stirring the mixture for 1 hour. And 9.74 g (0.048 mole), which was 96% based on the introduced molar amount, of terephthaloyl chloride (TPC) as a second dicarbonyl compound was added, followed by stirring the mixture for 1 hour, thereby preparing a first polymer solution.

The viscosity of the first polymer solution thus prepared was measured. If the measured viscosity did not reach the target viscosity, a TPC solution in a DMAc organic solvent at a concentration of 10% by weight was prepared, and 1 ml of the TPC solution was added to the first polymer solution, followed by stirring the mixture for 30 minutes. This procedure was repeated until the viscosity became about 200,000 cps, thereby preparing a second polymer solution.

Then, the second polymer solution was coated onto a glass plate and then dried with hot air at 80° C. for 30 minutes. The dried polyamide-imide polymer was peeled off from the glass plate and fixed to a pin frame, which is then thermally treated for 30 minutes while the temperature was raised at a temperature elevation rate of 2° C./min to 80° C./min in the temperature range of 80° C. to 500° C., thereby obtaining a polyamide-imide film having a thickness of 50 µm.

According to the above Example, the yield reached about 100% immediately before the film formation step (i.e., immediately before the coating). Here, the "yield" refers to the ratio of the number of moles of the materials remaining in the solution for coating to the number of moles of the charged materials.

According to the conventional preparation process, the yield immediately before the film formation step is about 60%. This attributes to the inevitable loss of raw materials during the steps of polyimidization reaction, precipitation, filtration, drying, and the like.

Comparative Example 1

A polyimide-imide film was prepared in the same manner as in Example 1, except that the silica dispersion prepared in Preparation Example 1 was not introduced to the glass reactor.

Comparative Example 2

A polyamide-imide film was prepared in the same manner as in Example 1, except that the silica dispersion prepared in Preparation Example 1 was introduced into the glass reactor after the preparation of the second polymer solution.

Comparative Example 3

A polyamide-imide film was prepared in the same manner as in Example 1, except that 0.052 mole of 6-FDA, 0.082 mole of BPDC, and 0.066 mole of TPC in total were employed and that the silica dispersion prepared in Preparation Example 1 was introduced into the glass reactor after the preparation of the second polymer solution.

Comparative Example 4

A polyamide-imide film was prepared in the same manner as in Example 1, except that 6-FDA was introduced in an amount of 0.2 mole, and TPC and BPDC were not employed, that the average particle diameter of secondary particles of the silica particles was about 80 nm, and that the silica dispersion prepared in Preparation Example 1 was introduced into the glass reactor after the preparation of the second polymer solution.

The kinds and contents of the components used in Example 1 and Comparative Examples 1 to 4 are shown Table 1 below.

TABLE 1

| | 6-FDA (mole) | TPC (mole) | BPDC (mole) | TFDB (mole) | Average particle diameter of secondary particles of silica particles | Introduction timing of silica particles |
|---|---|---|---|---|---|---|
| Example 1 | 0.04 | 0.05 | 0.1 | 0.2 | 50 nm | Introduced in advance |
| Comparative Example 1 | 0.04 | 0.05 | 0.1 | 0.2 | — | Not introduced |
| Comparative Example 2 | 0.04 | 0.05 | 0.1 | 0.2 | 50 nm | Introduced later |
| Comparative Example 3 | 0.052 | 0.066 | 0.082 | 0.2 | 50 nm | Introduced later |
| Comparative Example 4 | 0.2 | — | — | 0.2 | 80 nm | Introduced later |

Evaluation Example

The films of Example 1 and Comparative Examples 1 to 4 were each measured and evaluated for the following properties. The results are shown in Table 2 below.

Evaluation Example 1: Measurement of Film Thickness

The thickness was measured at 5 points in the width direction using a digital micrometer 547-401 manufactured by Mitutoyo Corporation in Japan, Their average value was adopted as the thickness.

Evaluation Example 2: Measurement of Surface Hardness

The surface hardness was measured with a pencil hardness measuring instrument (CT-PC1, CORE TECH, Korea) with a pencil hardness measuring pencil mounted at an angle of 45° and at a pencil speed of 300 mm/min while a constant load (750 g) was applied. The pencil used was Mitsubishi pencils having a strength of H to 9H, F, HB, B to 6B, and the like.

Evaluation Example 3: Measurement of Light Transmittance, UV Transmittance, and Haze The light transmittance at 550 nm and the haze were measured using a haze meter NDH-5000W manufactured by Nippon Denshoku Kogyo. The light transmittance at 388 nm was measured using a UV-VIS SPECTROPHOTOMETER (UV-2450) manufactured by Shimadzu Corporation in Japan.

Evaluation Example 4: Measurement of Yellow Index

The yellow Index (YI) was measured with a spectrophotometer (UltraScan PRO, Hunter Associates Laboratory) using a CIE colorimetric system.

Evaluation Example 5: Measurement of Modulus

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The slope of the load with respect to the initial strain on the stress-strain curve was taken as the modulus (GPa).

Evaluation Example 6: Measurement of Tensile Strength

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The maximum power exerted at the time of fracture in the stress-strain curve was defined as the tensile strength (kgf/mm$^2$).

Evaluation Example 7: Measurement of Elongation

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The maximum ratio of elongation at the time of fracture in the stress-strain curve was defined as the elongation (%).

Evaluation Example 8: SEM Photographs

SEM photographs were taken at magnifications of 5,000, 10,000, and 50,000 times for the films according to Example 1 and Comparative Example 2, respectively. The results are shown in FIGS. 1 to 6.

Specifically, in Example 1 (see FIG. 3), aggregates having an average diameter of 150 to 200 nm were not observed. In contrast, in Comparative Example 2 (see FIG. 6), two agglomerates having an average diameter of about 150 to 200 nm per about 4 μm² were observed (i.e., 0.5/μm²). This shows that the aggregation phenomenon of the silica particles relatively took place in Comparative Example 2 as compared with Example 1.

TABLE 2

| Item | Unit | Example 1 | Comp. Example 1 | Comp. Example 2 | Comp. Example 3 | Comp. Example 4 |
|---|---|---|---|---|---|---|
| Thickness | μm | 50 | 50 | 50 | 50 | 50 |
| Surface hardness | — | 2H | 2H | 2H | 2H | 6B |
| Light transmittance (@ 550 nm) | % | 88.9 | 88.9 | 88.7 | 88.2 | 90.1 |
| UV transmittance (@ 388 nm) | % | 63.4 | 63.7 | 63.3 | 65.6 | 63.2 |
| Haze | % | 0.7 | 0.7 | 1.0 | 1.0 | 1.26 |
| Yellow index | — | 2.3 | 2.5 | 3.1 | 2.03 | 2.2 |
| Modulus | GPa (room temp.) | 6.4 | 6.2 | 6.0 | 5.8 | 4.0 |
| Tensile strength | kgf/mm² | 24.1 | 21.8 | 21.6 | 14.6 | 10.4 |
| Elongation | % | 21.5 | 17.5 | 14.4 | 4.3 | 5.7 |

As can be seen from the above Table 2, the film prepared in Example 1, as compared with those prepared in Comparative Examples 1 to 5, had excellent surface hardness, high light transmittance, high UV transmittance, low haze, low yellow index, high modulus, high tensile strength, and high elongation.

Specifically, in Comparative Example 1 in which silica particles were not introduced, the modulus, elongation, tensile strength, and windability were deteriorated. In Comparative Example 2, in which the silica particles were introduced later, the modulus, elongation, tensile strength, and windability were even lower than those of Comparative Example 1. As can be seen from the SEM photographs of FIGS. 4 to 6, in two aggregates having an average diameter of 150 to 200 nm per about 4 μm² were observed (that is, 0.5/μm²), which indicated low dispersibility. In Comparative Example 2, the agglomerates act as a foreign matter, resulting in a decrease in mechanical properties and an increase in haze. In addition, in Comparative Examples 3 and 4, the surface hardness, haze, modulus, tensile strength, and elongation were deteriorated.

That is, it was confirmed that a polyamide-imide film, which is excellent in optical properties and has improved modulus, tensile strength, and elongation, can be obtained by introducing silica particles at a specific timing and dispersing them uniformly in the preparation of a polyamide-imide film.

The invention claimed is:

1. A polyamide-imide film, which comprises:
    a polyamide-imide polymer formed by polymerizing a diamine compound, a dianhydride compound, and a dicarbonyl compound; and silica particles,
    wherein the number of aggregates having an average diameter of 150 to 200 nm observed in a cross-section cut in the thickness direction of the polyamide-imide film is less than 0.5/μm², and
    wherein a ratio of an average particle diameter of secondary particles to an average particle diameter of primary particles of the silica particles is 1.2 to 3.0.

2. The polyamide-imide film of claim 1, wherein the average particle size of primary particles of the silica particles is 10 to 40 nm, and
    the average particle size of secondary particles of the silica particles is 30 to 80 nm.

3. The polyamide-imide film of claim 1, wherein the content of the silica particles is 50 to 600 ppm based on the total weight of the polyamide-imide polymer.

4. The polyamide-imide film of claim 1, wherein the number of aggregates having an average diameter of 150 to 200 nm observed in a cross-section cut in the thickness direction of the polyamide-imide film is 0 to 0.3/μm².

5. The polyamide-imide film of claim 1, wherein the diamine compound is represented by the following Formula 1,
    the dianhydride compound is represented by the following Formula 2, and
    the dicarbonyl compound is represented by the following Formula 3:

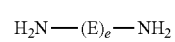

[Formula 1]

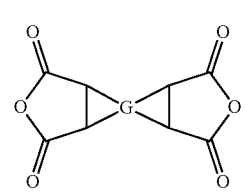

[Formula 2]

-continued

[Formula 3]

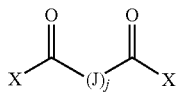

in the above Formulae 1 to 3,

E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the 2 or more Es are the same as, or different from, each other, when j is 2 or more, then the 2 or more Js are the same as, or different from, each other, G is a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group is present alone, bonded to each other to form a condensed ring, or bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, and X is a halogen atom.

6. The polyamide-imide film of claim 1, wherein the dianhydride compound is composed of a compound having a fluorine-containing substituent.

7. The polyamide-imide film of claim 1, wherein the dicarbonyl compound comprises at least two dicarbonyl compounds different from each other.

8. The polyamide-imide film of claim 1, wherein the polyamide-imide polymer comprises a repeat unit represented by the following Formula A and a repeat unit represented by the following Formula B:

[Formula A]

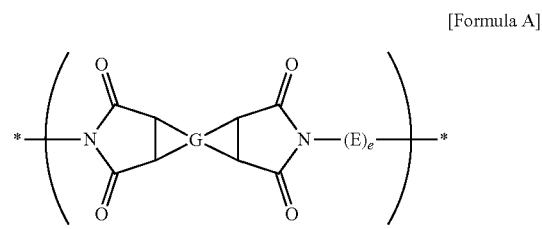

[Formula B]

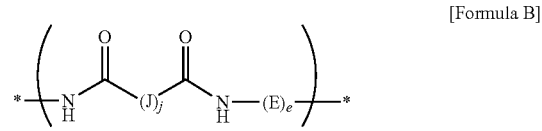

wherein E, G, J, e, and j in the above Formulae A and B are as described in claim 5.

9. The polyamide-imide film of claim 8, wherein in the polyamide-imide polymer, the molar ratio of the repeat unit represented by the above Formula A to the repeat unit represented by the above Formula B is 10:90 to 25:75.

10. The polyamide-imide film of claim 1, which, based on a thickness of 50 μm, has a modulus of 5.0 GPa or more, an elongation of 15% or more, a tensile strength of 15 kgf/mm$^2$ or more, and a haze of 2% or less.

* * * * *